(12) United States Patent
Cagnina et al.

(10) Patent No.: US 11,945,588 B2
(45) Date of Patent: Apr. 2, 2024

(54) STOWAGE BIN ASSEMBLIES FOR AND A METHOD FOR INCREASING OVERHEAD SPACE AND CONFIGURABILITY IN AN INTERNAL CABIN OF A VEHICLE

(71) Applicant: THE BOEING COMPANY, Chicago, IL (US)

(72) Inventors: Franco Marino Cagnina, Lynnwood, WA (US); Andrew Leo Fabry, Seattle, WA (US); Gary Evans Liljebeck, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/867,904

(22) Filed: Jul. 19, 2022

(65) Prior Publication Data

US 2023/0099129 A1 Mar. 30, 2023

Related U.S. Application Data

(60) Provisional application No. 63/249,048, filed on Sep. 28, 2021.

(51) Int. Cl.
*B64D 11/00* (2006.01)

(52) U.S. Cl.
CPC ...... *B64D 11/003* (2013.01); *B64D 2231/025* (2013.01)

(58) Field of Classification Search
CPC .............................. B64D 11/00; B64D 11/003
See application file for complete search history.

(56) References Cited

U.S. PATENT DOCUMENTS

| 7,922,119 B2 * | 4/2011 | Muin | B64D 11/003 244/118.1 |
|---|---|---|---|
| 2011/0146686 A1 | 6/2011 | Schneider | |
| 2012/0186586 A1 | 7/2012 | Gill | |

(Continued)

FOREIGN PATENT DOCUMENTS

| EP | 3254967 | 12/2017 |
|---|---|---|
| EP | 3677311 | 7/2020 |
| GB | 2237207 | 1/1991 |

OTHER PUBLICATIONS

U.S. Appl. No. 17/732,720, filed Apr. 29, 2022.
Extended European Search Report for EP 22198449.5-1004, dated Jan. 27, 2023.

*Primary Examiner* — Brady W Frazier
*Assistant Examiner* — Shanna Danielle Glover
(74) *Attorney, Agent, or Firm* — Joseph M. Butscher; The Small Patent Law Group LLC

(57) ABSTRACT

A vehicle includes an internal cabin, a plurality of stowage bin assemblies within the internal cabin, a plurality of passenger service units (PSUs) within the internal cabin, and an emergency oxygen system within the internal cabin. The plurality of stowage bin assemblies are uncoupled (for example, separate and distinct) from one or both of the plurality of PSUs or the emergency oxygen system. In an example, the plurality of stowage bin assemblies are uncoupled from the emergency oxygen system. In another example, the plurality of stowage bin assemblies are uncoupled from the plurality of PSUs. In another example, the plurality of stowage bin assemblies are uncoupled from both the plurality of PSUs and the emergency oxygen system.

19 Claims, 8 Drawing Sheets

(56) References Cited

U.S. PATENT DOCUMENTS

| | | |
|---|---|---|
| 2012/0325217 A1 | 12/2012 | Lang |
| 2013/0026293 A1 | 1/2013 | Schneider |
| 2015/0035424 A1 | 2/2015 | Rittner |
| 2015/0069182 A1* | 3/2015 | Jacobsen ............. B64D 11/003 244/118.5 |
| 2015/0087082 A1 | 4/2015 | Paulino |
| 2015/0166178 A1 | 6/2015 | Savian |
| 2018/0103554 A1 | 4/2018 | Ibrahim |
| 2018/0133074 A1 | 5/2018 | Delise |
| 2018/0155035 A1 | 6/2018 | Spagl |
| 2019/0193871 A1 | 6/2019 | Benthien |
| 2020/0079524 A1 | 3/2020 | Escobar |
| 2020/0180765 A1* | 6/2020 | Behr ...................... B64C 1/18 |

* cited by examiner

STOWAGE BIN ASSEMBLIES FOR AND A METHOD FOR INCREASING OVERHEAD SPACE AND CONFIGURABILITY IN AN INTERNAL CABIN OF A VEHICLE

CROSS-REFERENCE TO RELATED APPLICATIONS

This application relates to and claims priority benefits from U.S. Provisional Patent Application No. 63/249,048, filed Sep. 28, 2021, which is hereby incorporated by reference in its entirety.

FIELD OF THE DISCLOSURE

Embodiments of the present disclosure generally relate to stowage bin assemblies for internal cabins of aircraft.

BACKGROUND OF THE DISCLOSURE

Vehicles such as commercial aircraft are used to transport passengers between various locations. Emergency oxygen assemblies are provided within internal cabins of commercial aircraft. In the event of a predetermined depressurization within an internal cabin, the emergency oxygen assemblies are configured to deploy so that passengers are able to breathe therefrom.

Typically, the emergency oxygen assemblies, including masks and conduits, are housed within passenger service units (PSUs), which are disposed above seats within the internal cabin. The PSUs are further generally part of a larger assembly that includes a stowage bin. As can be appreciated, the emergency oxygen assemblies occupy space within the PSUs, thereby precluding other components from being housed within the PSUs. Additionally, the PSUs and emergency oxygen assemblies occupy space within an overall assembly, which can limit the size, shape, and overall configuration of a stowage bin assembly.

Notably, because overall assemblies including a stowage bin, PSU, and oxygen drop occupy space within an internal cabin, such assemblies limit overhead space. Such assemblies may cause taller individuals, for example, a degree of discomfort. That is, such individuals may not be able to stand fully upright in the vicinity of such assemblies, and may be unable to easily and comfortably manipulate stowage bins of the assemblies.

SUMMARY OF THE DISCLOSURE

A need exists for a system and a method for freeing up space within a stowage bin assembly. Further, a need exists a system and a method for allowing different sizes and shapes of stowage bin assemblies. Moreover, a need exists for a system and a method that allows for increased overhead space within an internal cabin of a vehicle.

With those needs in mind, certain embodiments provide a vehicle including an internal cabin, a plurality of stowage bin assemblies within the internal cabin, a plurality of passenger service units (PSUs) within the internal cabin, and an emergency oxygen system within the internal cabin. The plurality stowage bin assemblies are uncoupled from one or both of the plurality of PSUs or the emergency oxygen system.

In at least one example, the plurality of stowage bin assemblies are uncoupled from the emergency oxygen system. In at least one other example, the plurality of stowage bin assemblies are uncoupled from the plurality of PSUs. In at least one other example, the plurality of stowage bin assemblies are uncoupled from both the plurality of PSUs and the emergency oxygen system.

In at least one embodiment, the internal cabin is devoid of a housing that retains at least a portion of the emergency oxygen system, at least one of the plurality of stowage bin assemblies, and at least one of the plurality of PSUs.

In at least one embodiment, each of the plurality of stowage bin assemblies comprises a moveable portion moveably coupled to a fixed structure. The fixed structure can be a strongback. As an example, the moveable portion secures to a first side of the strongback, and at least one of the PSUs secures to a second side, opposite from the first side, of the strongback.

As an example, the moveable portion is a pivot bin. As another example, the moveable portion is a sliding door.

In at least one embodiment, at least one area within the internal cabin includes at least a portion of the emergency oxygen system, but is devoid of the plurality of stowage bin assemblies.

Certain embodiments of the present disclosure provide a method for increasing overhead space and configurability with an internal cabin of a vehicle. The method includes uncoupling a plurality of stowage bin assemblies from one or both of a plurality of passenger service units (PSUs) or an emergency oxygen system.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

As described herein, embodiments of the present disclosure provide systems and methods that reduce complexity of stowage bin assemblies within an internal cabin of an aircraft. In particular, the stowage bin assemblies are uncoupled from oxygen drops. Further, in at least one embodiment, the stowage bin assemblies are uncoupled from PSUs, which may also be uncoupled from the oxygen drops. Accordingly, embodiments of the present disclosure provide increased options (in terms of size, shape, and the like) for stowage bin assemblies. Further, by uncoupling the stowage bin assemblies from the oxygen drops (and optionally, the PSUs), the stowage bin assemblies can be positioned to allow for increased overhead space within an internal cabin.

As described herein, in at least one embodiment, a stowage bin assembly is separate and uncoupled from a PSU and oxygen drop elements to allow for more flexible bin configurations based on seating and aisle configuration and/or monuments within an internal cabin. As an example, the stowage bin assembly includes a moveable portion, such as a sliding bin door that opens and closes in a sliding manner to provide access to the bin contents, which may eliminate the traditional pivoting bin configuration to maximize head and shoulder room when opening the sliding bin door. As another example, the moveable portion includes a pivot style bin with a shorter/low profile to increase passenger head and shoulder space when standing in an aisle. Such examples are advantageous in 1×1×1 seating configuration and/or a twin aisle configuration, such as for first class on a narrow body aircraft, for instance. As another example, because the oxygen drops are uncoupled from the bins, a no bin architecture is possible, and instead of a stowage bin, a valence panel is provided to increase overhead space for taller monuments at locations where stowage space is unnecessary.

Figure 1:
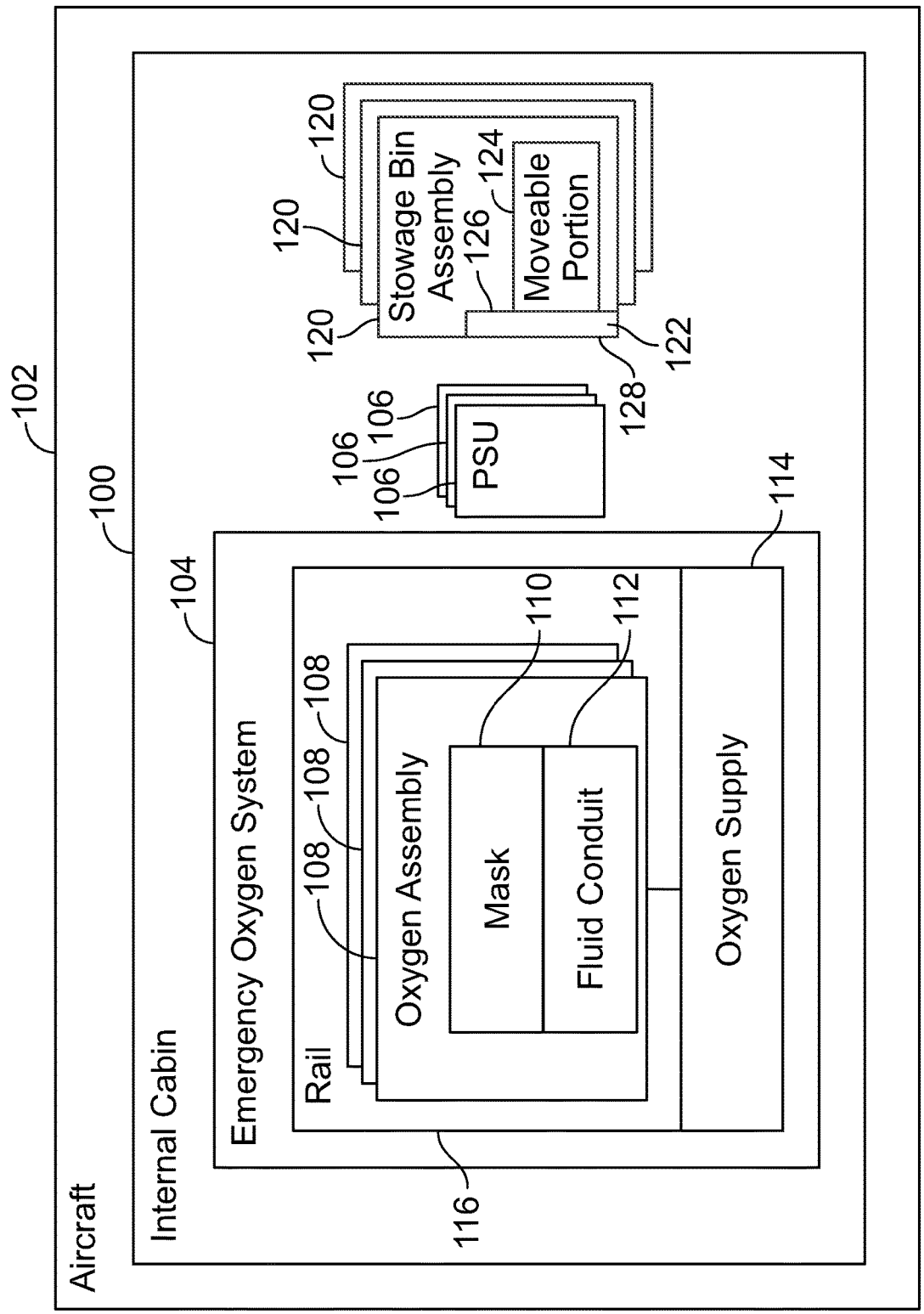
FIG. 1 illustrates a schematic block diagram of an internal cabin of an aircraft, according to an embodiment of the present disclosure.

FIG. 1 illustrates a schematic block diagram of an internal cabin 100 of an aircraft 102, according to an embodiment of the present disclosure. An emergency oxygen system 104 is disposed within the internal cabin 100. The emergency oxygen system 104 is separate and distinct from personal service units (PSUs) 106 within the internal cabin 100, and from stowage bin assemblies 120. In particular, the PSUs 106 do not include the emergency oxygen system 104, and vice versa. Further, the stowage bin assemblies 120 do not include the emergency oxygen system 104, and vice versa. Moreover, in at least one embodiment, the PSUs 106 are separate and distinct from the stowage bin assemblies 120. For example, the PSUs 106 do not include the stowage bin assemblies 120, and vice versa. In at least one embodiment, the stowage bin assemblies 120 are not connected to the PSUs 106. Optionally, the PSUs 106 can be secured to a fixed structure that is common to one or more of the stowage bin assemblies 120, such as a strongback 122.

The stowage bin assemblies 120 include a moveable portion 124 that is moveably coupled to a fixed structure, such as the strongback 122. As an example, the moveable portion 124 can be a pivotal bucket or bin. As another example, the moveable portion 124 can be a sliding door. In at least one embodiment, the moveable portion 124 is secured to a first side 126 of the strongback 122, and one or more of the PSUs 106 are secured to a second side 128 (opposite from the first side 126) of the strongback 122. Optionally, the PSUs 106 may not be secured to the strongback 122. Instead, the PSUs 106 can be completely separated from both the stowage bin assemblies 120 and the emergency oxygen system 104.

In at least one embodiment, the emergency oxygen system 104 includes a plurality of oxygen assemblies 108. The oxygen assemblies 108 include a mask 110 and a fluid conduit 112. During a sudden cabin depressurization, the oxygen assemblies 108 are configured to deploy (such as by dropping down). An oxygen supply 114 is in fluid communication with the fluid conduits 112. In at least one embodiment, each oxygen assembly 108 is in fluid communication with a respective oxygen supply 114, such as an oxygen canister fluidly coupled to the fluid conduit 112. In at least one other embodiment, an oxygen supply 114 such as an oxygen tank or cylinder is in fluid communication with a plurality of fluid conduits 112 of oxygen assemblies 108, such as via a manifold.

In at least one embodiment, the emergency oxygen system 104 includes a rail 116 that extends along a length of the internal cabin 100. The rail 116 retains the oxygen assemblies 108, such as at a position above and/or to the side of seats within the internal cabin 100. At least a portion of the oxygen supply 114 may also be retained by the rail 116. Optionally, the rail 116 does not retain the oxygen supply 114. Also, optionally, the emergency oxygen system 104 may not include the rail 116. Instead, the oxygen assemblies 108 may be secured to portions of the internal cabin (such as side walls, a ceiling, a floor, or the like) within the use of a rail.

The oxygen assemblies 108 are separate and distinct from the PSUs 106 and the stowage bin assemblies 120. The oxygen assemblies 108 are uncoupled from the PSUs 106 and the stowage bin assemblies 120. The PSUs 106 and the stowage bin assemblies 120 do not include the oxygen assemblies 108. In at least one embodiment, the internal cabin 100 does not include a common housing assembly that includes at least a portion of the emergency oxygen system 104, one or more of the PSUs 106, and one or more of the stowage bin assemblies 120. Instead, the stowage bin assemblies 120 are separate and distinct from the emergency oxygen system 104. Further, in at least one embodiment, the stowage bin assemblies 120 are separate and distinct from the PSUs 106. Optionally, the PSUs 106 can be mounted to portions of the stowage bin assemblies 120.

Certain embodiments of the present disclosure provide modular systems and methods that allow for stowage bin assemblies 120 to be selectively secured proximate to one or more PSUs 106 and the emergency oxygen system 104. That is, a stowage bin assembly 120 can be installed proximate to a PSU 106 and/or the emergency oxygen system 104, or not. Because the stowage bin assemblies 120 are separate and distinct from the PSUs 106 and the emergency oxygen system 104, various different arrangements and configurations can be used, as desired, within the internal cabin 100.

Examples of the emergency oxygen system 104 are further described in U.S. Patent Application No. 63/216,072, entitled "Emergency Oxygen Systems for Internal Cabins of Aircraft," filed Jun. 29, 2021, which is hereby incorporated by reference in its entirety.

As described herein, a vehicle (such as the aircraft 102) includes the internal cabin 100, a plurality of stowage bin assemblies 120 within the internal cabin 100, and an emergency oxygen system 104 within the internal cabin 100. The emergency oxygen system 104 uncoupled (for example, separate and distinct) from the plurality of plurality of stowage bin assemblies 120. In at least one embodiment, a plurality PSUs 106 are also within the internal cabin 100. The emergency oxygen system 104 is also uncoupled from the plurality of PSUs. In at least one embodiment, the plurality of stowage bin assemblies 120 are also uncoupled from the plurality of PSUs 106. In at least one example, the internal cabin 100 is devoid of a housing that retains at least a portion of the emergency oxygen system 104, at least one of the plurality of stowage bin assemblies 120, and at least one of the plurality of PSUs 106.

As described herein, a vehicle (such as the aircraft 102) includes the internal cabin 100, a plurality of stowage bin assemblies 120 within the internal cabin 100, a plurality of passenger service units (PSUs) 106 within the internal cabin 100, and an emergency oxygen system 104 within the internal cabin 100. The plurality of stowage bin assemblies 120 are uncoupled from one or both of the plurality of PSUs 106 or the emergency oxygen system 104. In an example, the plurality of stowage bin assemblies 120 are uncoupled from the emergency oxygen system 104. In another example, the plurality of stowage bin assemblies 120 are uncoupled from the plurality of PSUs 106. In another example, the plurality of stowage bin assemblies 120 are uncoupled from both the plurality of PSUs 106 and the emergency oxygen system 104.

As described herein, certain embodiments of the present disclosure provide a method for increasing overhead space and configurability with the internal cabin 100 of the vehicle, such as the aircraft 102. The method includes uncoupling a plurality of stowage bin assemblies 120 from one or both of a plurality of passenger service units (PSUs) 106 or an emergency oxygen system 104. In at least one embodiment, said uncoupling includes uncoupling the plurality of stowage bin assemblies 120 from the emergency oxygen system 104. As another example, said uncoupling includes uncoupling the plurality of stowage bin assemblies 120 from the plurality of PSUs 106. As another example, said uncoupling includes uncoupling the plurality of stowage bin assemblies 120 from both the plurality of PSUs 106 and the emergency oxygen system 104.

Figure 2:
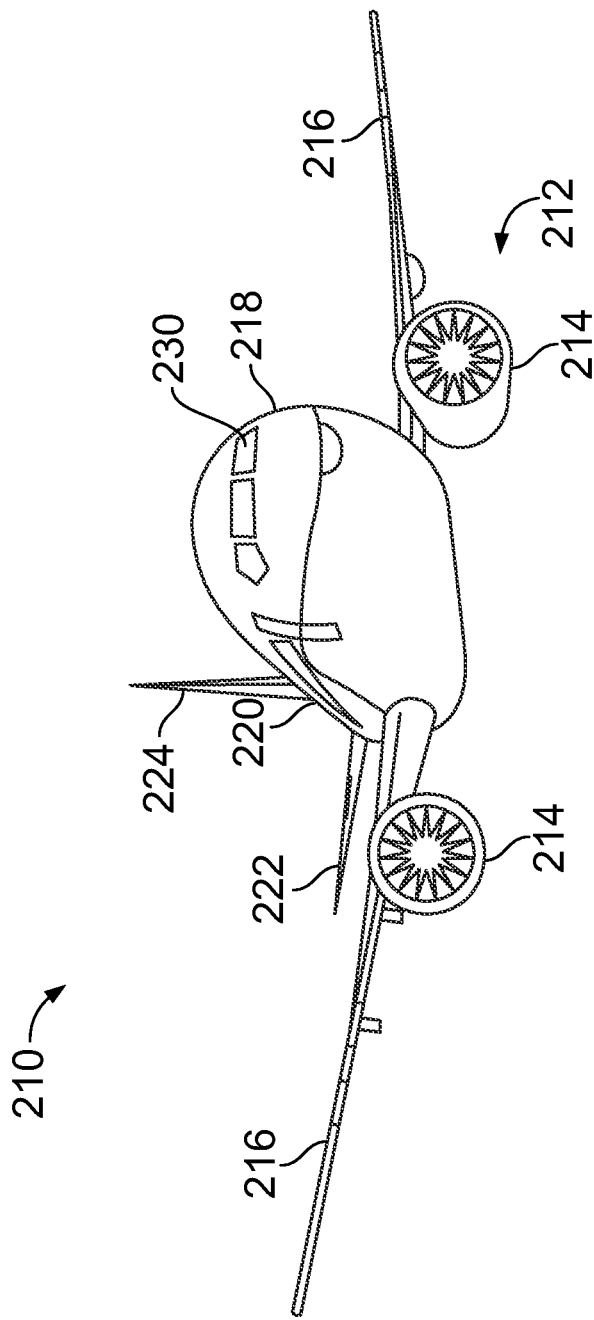
FIG. 2 illustrates a perspective front view of an aircraft, according to an embodiment of the present disclosure.

FIG. 2 illustrates a perspective front view of an aircraft 210, according to an embodiment of the present disclosure. The aircraft 210 is an example of the aircraft 102, shown in FIG. 1. The aircraft 210 includes a propulsion system 212 that includes engines 214, for example. Optionally, the propulsion system 212 may include more engines 214 than shown. The engines 214 are carried by wings 216 of the aircraft 210. In other embodiments, the engines 214 may be carried by a fuselage 218 and/or an empennage 220. The empennage 220 may also support horizontal stabilizers 222 and a vertical stabilizer 224.

The fuselage 218 of the aircraft 210 defines an internal cabin 230, which includes a flight deck or cockpit, one or more work sections (for example, galleys, personnel carry-on baggage areas, and the like), one or more passenger sections (for example, first class, business class, and coach sections), one or more lavatories, and/or the like. The internal cabin 230 is an example of the internal cabin 100, as shown in FIG. 1.

Alternatively, instead of an aircraft, embodiments of the present disclosure may be used with various other vehicles, such as automobiles, buses, locomotives and train cars, watercraft, and the like. Further, embodiments of the present disclosure may be used with respect to fixed structures, such as commercial and residential buildings.

Figure 3A:
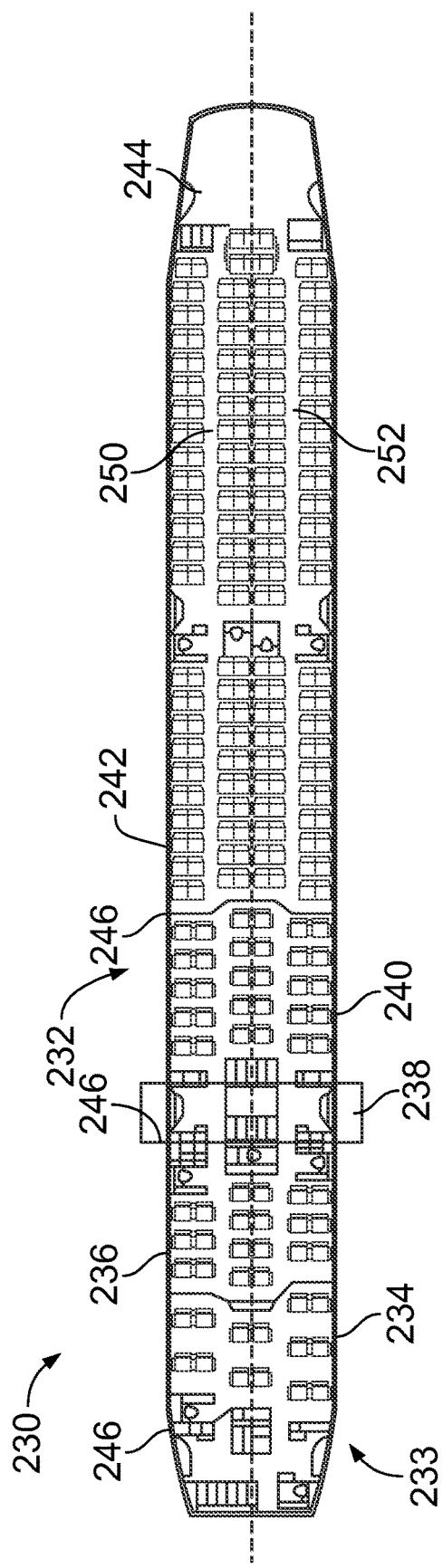
FIG. 3A illustrates a top plan view of an internal cabin of an aircraft, according to an embodiment of the present disclosure.

FIG. 3A illustrates a top plan view of an internal cabin 230 of an aircraft, according to an embodiment of the present disclosure. The internal cabin 230 may be within the fuselage 232 of the aircraft, such as the fuselage 218 of FIG. 2. For example, one or more fuselage walls may define the internal cabin 230. The internal cabin 230 includes multiple areas, including a front section 233, a first-class section 234, a business class section 236, a front galley station 238, an expanded economy or coach section 240, a standard economy of coach section 242, and an aft section 244. It is to be understood that the internal cabin 230 may include more or less areas than shown. For example, the internal cabin 230 may not include a first-class section, and may include more or less galley stations than shown. Each of the sections may be separated by a cabin transition area 246, which may include class divider assemblies between aisles.

As shown in FIG. 3A, the internal cabin 230 includes two aisles 250 and 252 that lead to the aft section 244. Optionally, the internal cabin 230 may have less or more aisles than shown. For example, the internal cabin 230 may include a single aisle that extends through the center of the internal cabin 230 that leads to the aft section 244.

The emergency oxygen system 104, the PSUs 106, and the stowage bin assemblies 120 shown in FIG. 1 can be disposed within the internal cabin 230. For example, the rail 116 can extend along a length of the internal cabin 230.

Figure 3B:
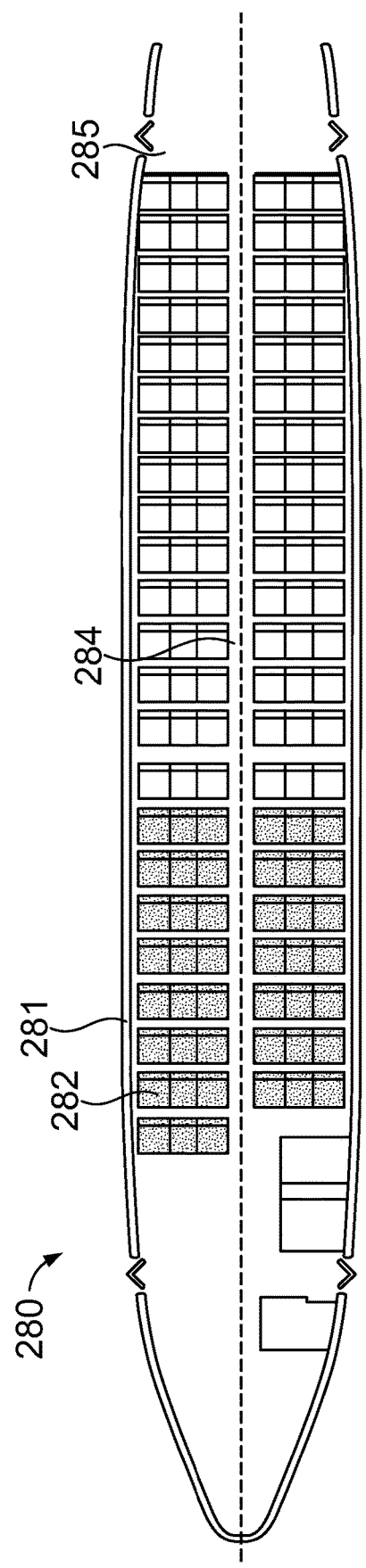
FIG. 3B illustrates a top plan view of an internal cabin of an aircraft, according to an embodiment of the present disclosure.

FIG. 3B illustrates a top plan view of an internal cabin 280 of an aircraft, according to an embodiment of the present disclosure. The internal cabin 280 is an example of the internal cabin 230 shown in FIG. 2. The internal cabin 280 may be within a fuselage 281 of the aircraft. For example, one or more fuselage walls may define the internal cabin 280. The internal cabin 280 includes multiple areas, including a main cabin 282 having passenger seats, and an aft section 285 behind the main cabin 282. It is to be understood that the internal cabin 280 may include more or less areas than shown.

The internal cabin 280 may include a single aisle 284 that leads to the aft section 285. The single aisle 284 may extend through the center of the internal cabin 280 that leads to the aft section 285. For example, the single aisle 284 may be coaxially aligned with a central longitudinal plane of the internal cabin 280.

The emergency oxygen system 104, the PSUs 106, and the stowage bin assemblies 120 shown in FIG. 1 can be disposed within the internal cabin 280. For example, the rail 116 can extend along a length of the internal cabin 280.

Figure 4:
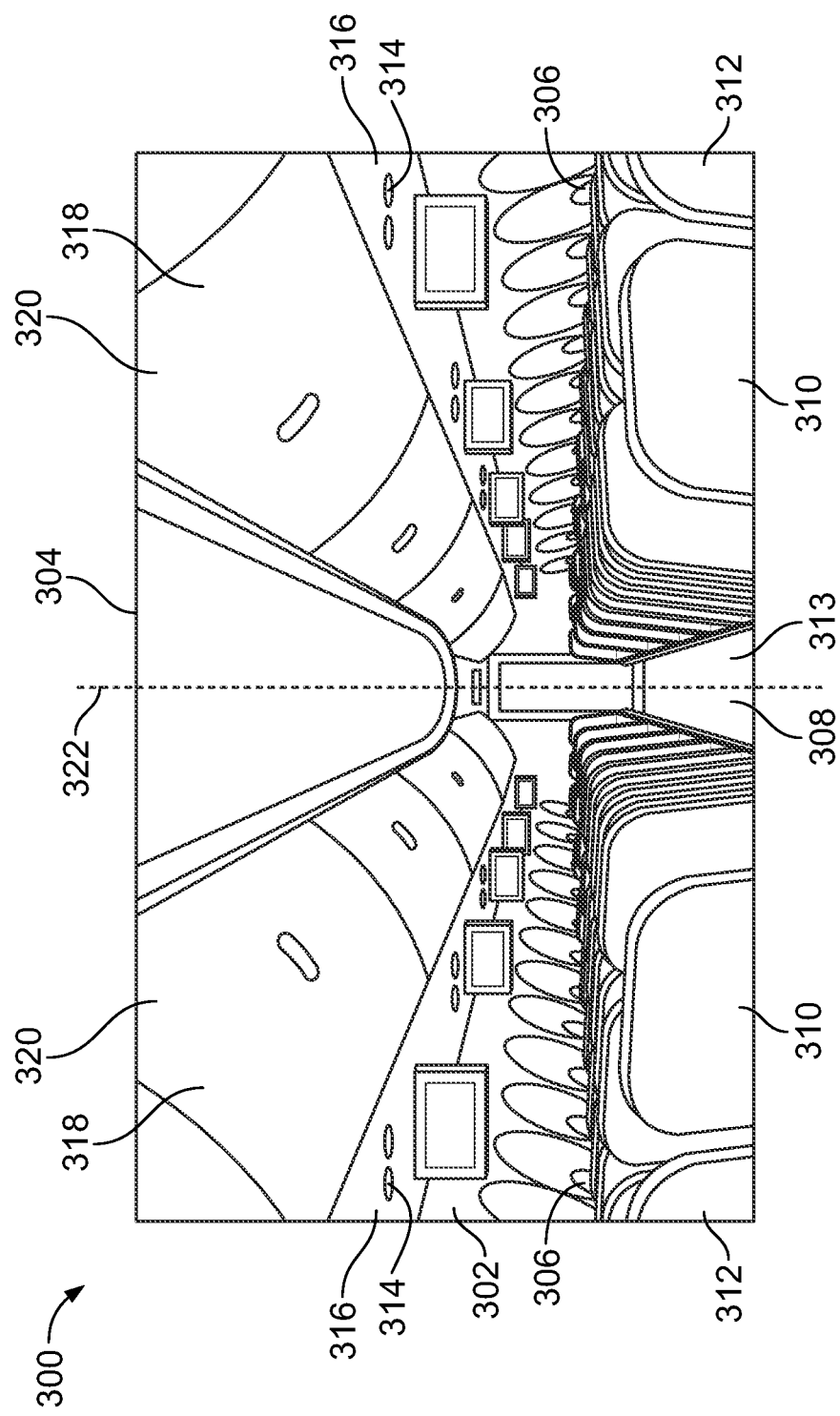
FIG. 4 illustrates a perspective interior view of an internal cabin of an aircraft, according to an embodiment of the present disclosure.

FIG. 4 illustrates a perspective interior view of an internal cabin 300 of an aircraft, according to an embodiment of the present disclosure. The internal cabin 300 is an example of the internal cabin 100 shown in FIG. 1. The internal cabin 300 includes outboard walls 302 connected to a ceiling 304. Windows 306 may be formed within the outboard walls 302. A floor 308 supports rows of seats 310. As shown in FIG. 4, a row 312 may include two seats 310 on either side of an aisle 313. However, the row 312 may include more or less seats 310 than shown. Additionally, the internal cabin 300 may include more aisles than shown.

PSUs 314 are secured between an outboard wall 302 and the ceiling 304 on either side of the aisle 313. The PSUs 314 extend between a front end and rear end of the internal cabin 300. For example, a PSU 314 may be positioned over each seat 310 within a row 312. Each PSU 314 may include a housing 316 that generally contains vents, reading lights, an attendant request button, and other such controls over each seat 310 (or groups of seats) within a row 312. Notably, the PSUs 314 do not include the oxygen assemblies 108 shown in FIG. 1.

Overhead stowage bin assemblies 318 are secured to the ceiling 304 and/or the outboard wall 302 above and inboard from the PSU 314 on either side of the aisle 313. The overhead stowage bin assemblies 318 are secured over the seats 310. The overhead stowage bin assemblies 318 extend between the front and rear end of the internal cabin 300. Each stowage bin assembly 318 may include a pivot bin or bucket 320 pivotally secured to a strongback. The overhead stowage bin assemblies 318 may be positioned above and inboard from lower surfaces of the PSUs 314. The overhead stowage bin assemblies 318 are configured to be pivoted open in order to receive passenger carry-on baggage and personal items, for example.

As used herein, the term "outboard" means a position that is further away from a central longitudinal plane 322 of the internal cabin 300 as compared to another component. The term "inboard" means a position that is closer to the central longitudinal plane 322 of the internal cabin 300 as compared to another component. For example, a lower surface of a PSU 314 may be outboard in relation to a stowage bin assembly 318.

Figure 5:
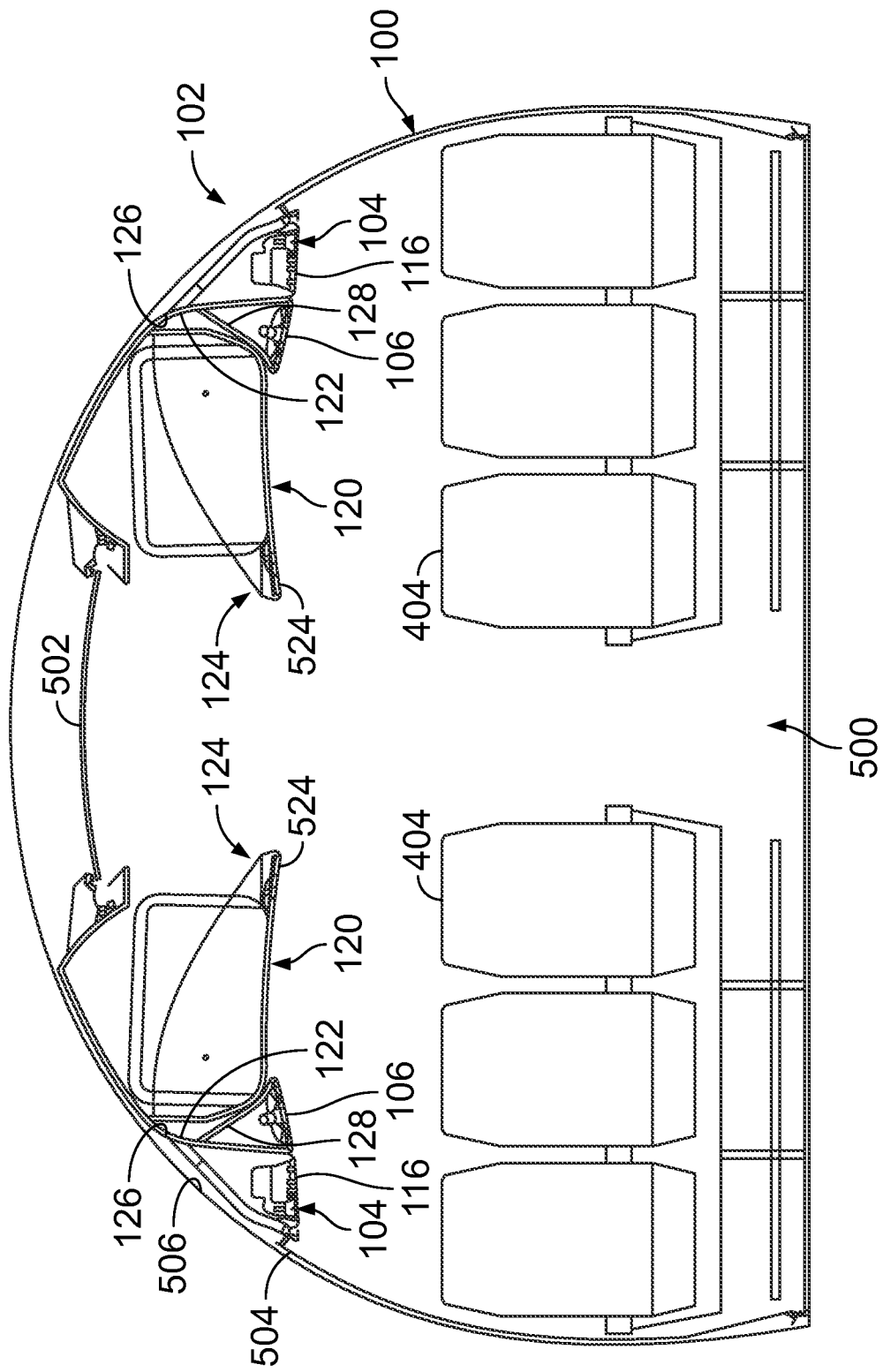
FIG. 5 illustrates an axial cross-sectional view of an internal cabin of an aircraft, according to an embodiment of the present disclosure.

FIG. 5 illustrates a perspective internal view of an internal cabin 100 of an aircraft 102, according to an embodiment of the present disclosure. The aircraft 102 can include a single aisle 500. Emergency oxygen systems 104 can be disposed to each side of the aisle 500. The emergency oxygen systems 104 extend along a length of the internal cabin 100.

Each emergency oxygen system 104 is secured to a sidewall 504 and/or a ceiling 506 of the internal cabin 100. The emergency oxygen systems 104 are outboard from the PSUs 106 and the stowage bin assemblies 120. As shown, the PSUs 106 can be disposed between the emergency oxygen system 104 and the stowage bin assemblies 120.

As shown, a stowage bin assembly 120 includes a moveable portion 124 moveably coupled to a strongback 122. For example, the moveable portion 124 is or otherwise includes a pivot bin 524. The pivot bin 524 is moveably coupled to the first surface 126 of the strongback 122. The PSU 106 can be secured to the second surface 128 of the strongback 122. Optionally, the PSU 106 can be completely separated from the strongback 122.

The emergency oxygen system 104, including the rail 116 is separated from the PSUs 106 and the stowage bin assemblies 120. In at least one embodiment, the emergency oxygen system 104 does not secure or otherwise connect to the PSUs 106 and/or the stowage bin assemblies 120.

Optionally, the internal cabin 100 can include multiple aisles. An emergency oxygen system 104 can be disposed above a center section of seats 404 between the aisles.

In at least one embodiment, an emergency oxygen system 104 can be secured to a ceiling 502 over the aisle 500. The emergency oxygen system 104 can be in addition to, or in place of, the emergency oxygen systems 104 shown proximate to the sidewalls 504.

Figure 6:
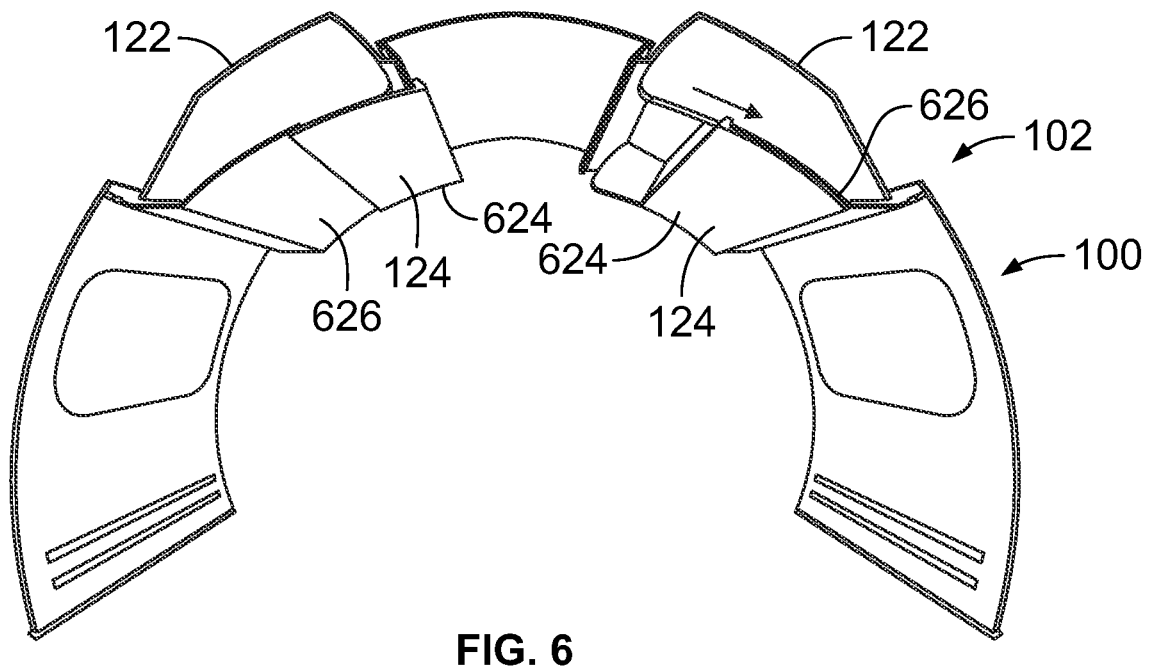
FIG. 6 illustrates a perspective internal view of an internal cabin of an aircraft, according to an embodiment of the present disclosure.
Figure 7:
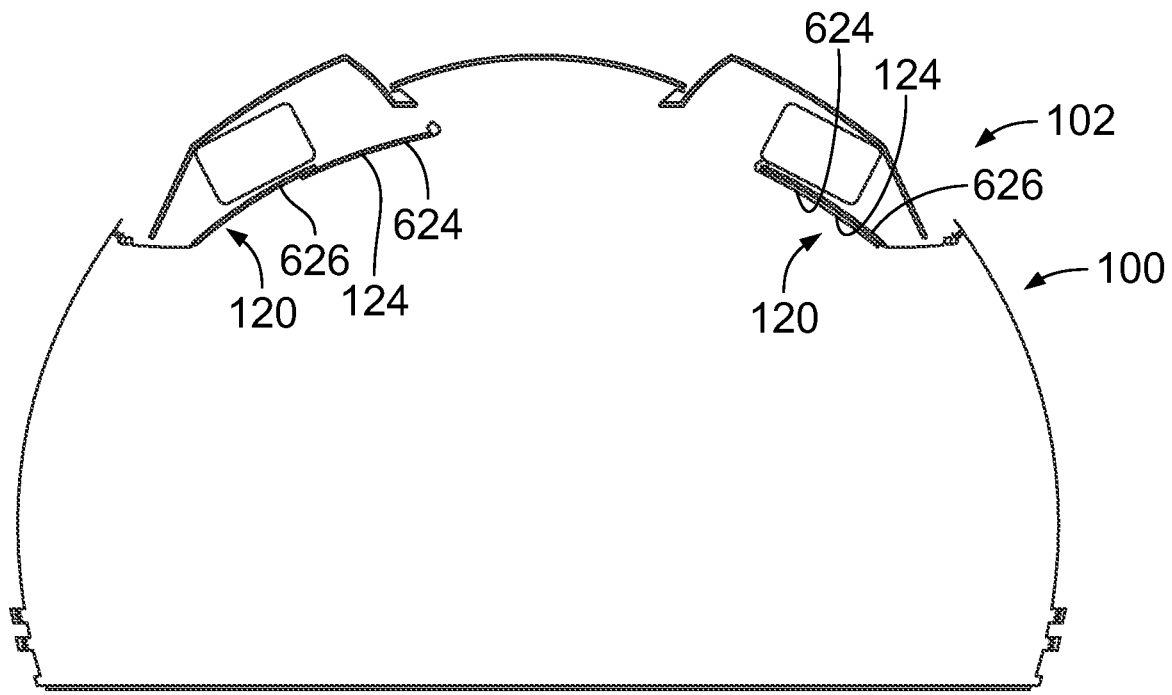
FIG. 7 illustrates an axial cross-sectional view of the internal cabin of FIG. 6.

FIG. 6 illustrates a perspective internal view of an internal cabin 100 of an aircraft 102, according to an embodiment of the present disclosure. FIG. 7 illustrates an axial cross-sectional view of the internal cabin 100 of FIG. 6. Referring to FIGS. 1, 6, and 7, in at least one embodiment, the moveable portion 124 of the stowage bin assemblies 120 can be or otherwise include a sliding door 624 that is configured to slide open and closed relative to a fixed bin 626 secured to the strongback 122.

Figure 8:
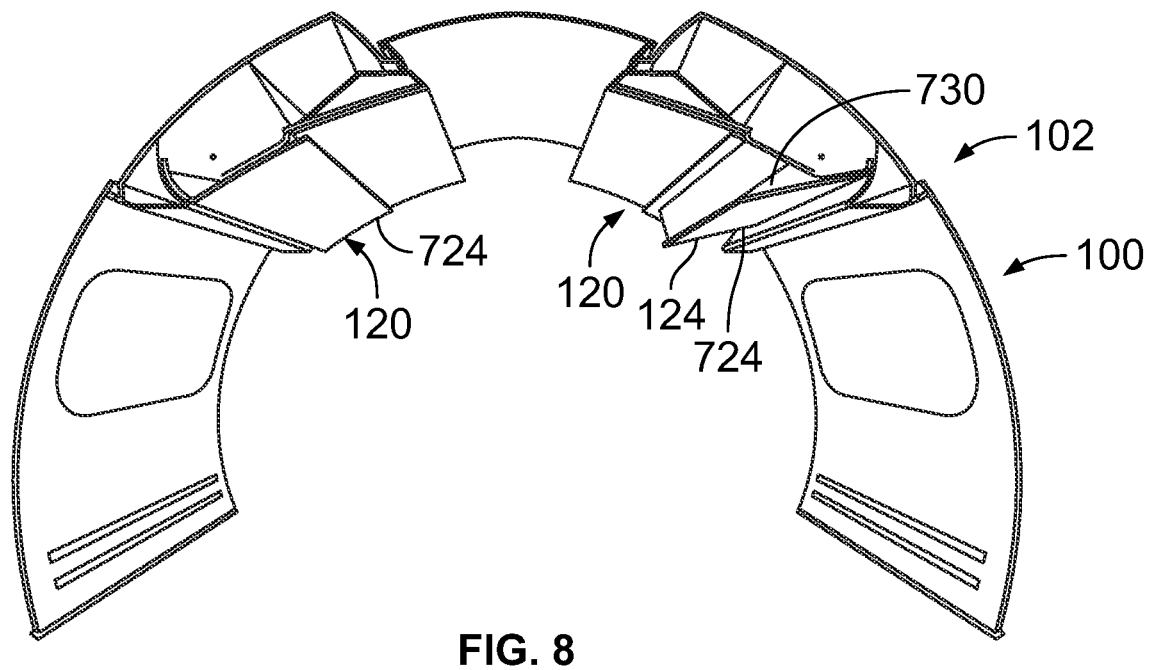
FIG. 8 illustrates a perspective internal view of an internal cabin of an aircraft, according to an embodiment of the present disclosure.
Figure 9:
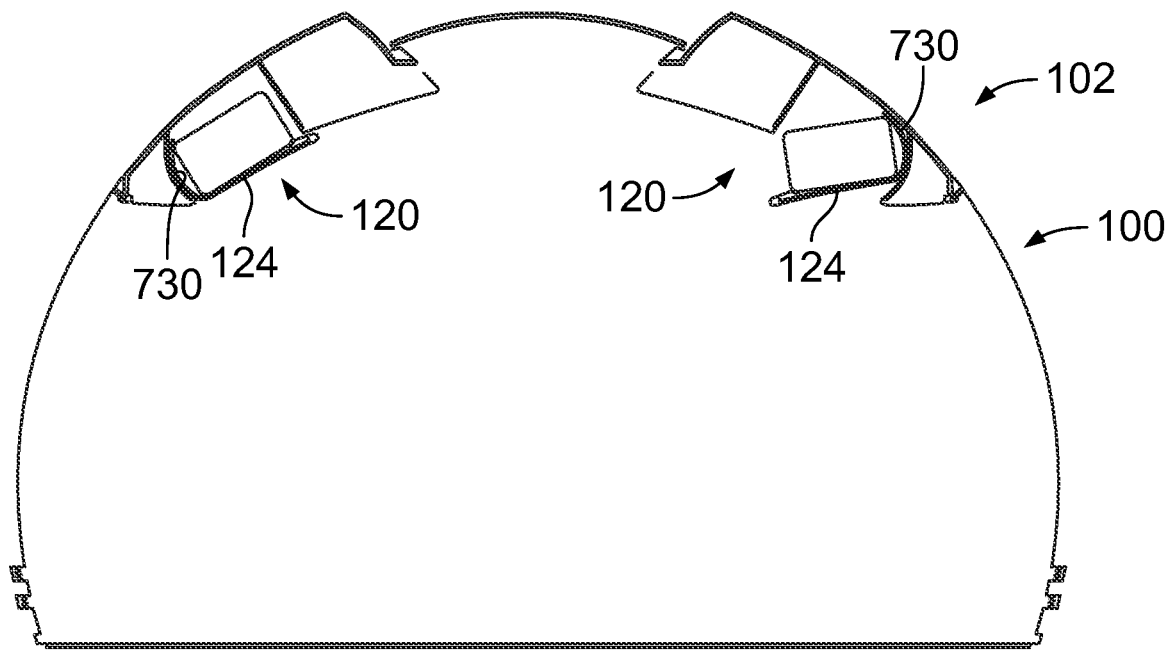
FIG. 9 illustrates an axial cross-sectional view of the internal cabin of FIG. 8.

FIG. 8 illustrates a perspective internal view of an internal cabin 100 of an aircraft 102, according to an embodiment of the present disclosure. FIG. 9 illustrates an axial cross-sectional view of the internal cabin 100 of FIG. 8. Referring to FIGS. 1, 8, and 9, in at least one embodiment, the moveable portion 124 of the stowage bin assemblies 120 can be or otherwise include a pivotal door 724 having a retaining bin 730 that is configured to pivot open and closed relative.

Figure 10:
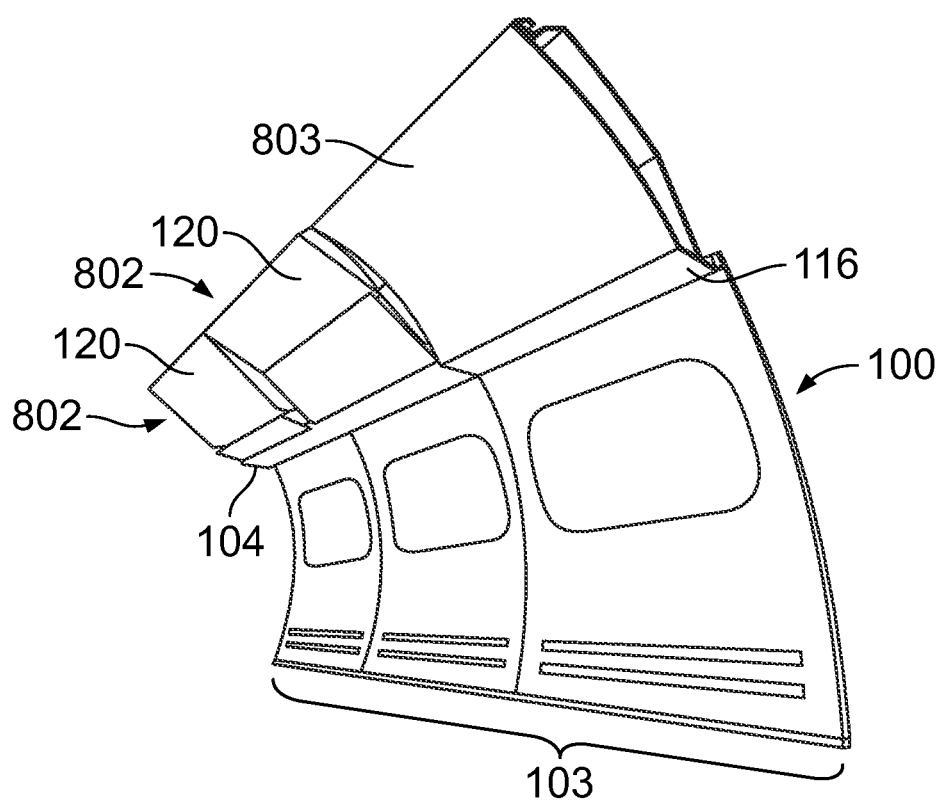
FIG. 10 illustrates a perspective lateral view of an emergency oxygen system within an internal cabin, according to an embodiment of the present disclosure.

FIG. 10 illustrates a perspective lateral view of the emergency oxygen system 104 within an internal cabin 100, according to an embodiment of the present disclosure. The emergency oxygen system 104 extends along the length 103, which may include areas 802 having stowage bin assemblies 120 (such as any of those described above), and areas 803 that are devoid of stowage bin assemblies 120. The areas 802 and 803 may or may not include PSUs 106 (shown in FIG. 1, for example). Because the stowage bin assemblies 120 are uncoupled (that is, separate and distinct) from the emergency oxygen system 104 and the PSUs 106, various areas of the internal cabin 100 can be customized with a desired arrangement of the stowage bin assemblies 120 and the PSUs 106, for example.

Figure 11:
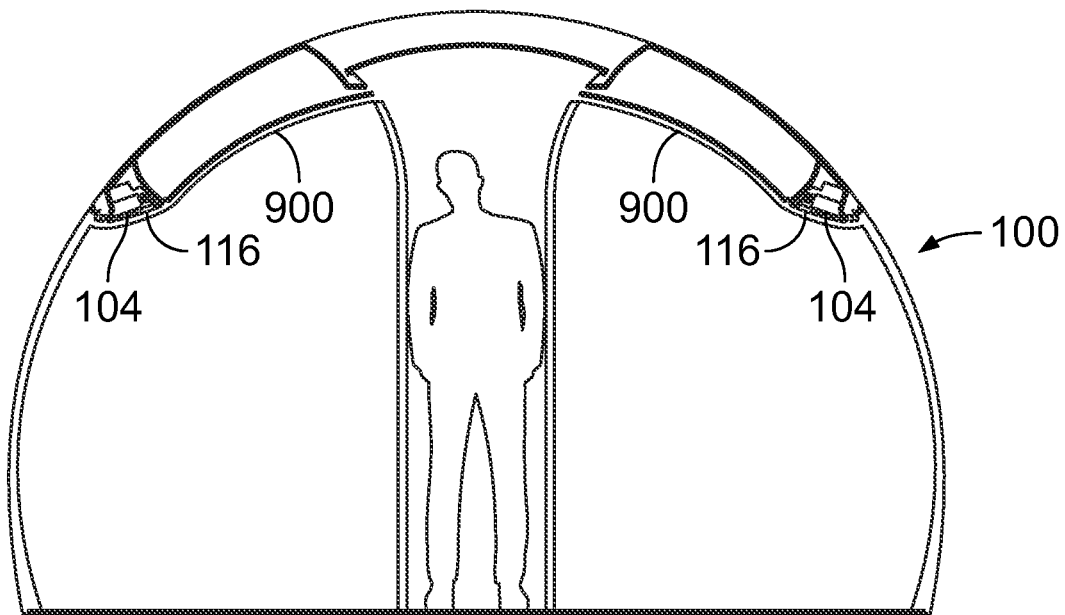
FIG. 11 illustrates an axial cross-sectional view of an internal cabin, according to an embodiment of the present disclosure.

FIG. 11 illustrates an axial cross-sectional view of an internal cabin 100, according to an embodiment of the present disclosure. As shown, at least a portion of the internal cabin 100 can be devoid of stowage bin assemblies 120 and/or PSUs 106, while still including the emergency oxygen system 104. Again, by uncoupling the emergency oxygen system 104 from both the PSUs 106 and the stowage bin assemblies 120, a wider variety of configurations within the internal cabin 100 can be provided, as desired. Because the oxygen drops are uncoupled from the stowage bin assemblies, a no bin architecture is possible (as shown in FIG. 1), and instead of a stowage bin, a valence panel 900 can be provided to increase overhead space for taller monuments where stowage space is unnecessary. As shown, at least one area within the internal cabin includes at least a portion of the emergency oxygen system 104 but is devoid of the plurality of stowage bin assemblies 120. The at least one are can also be devoid of PSUs 106.

Referring to FIGS. 1-11, embodiments of the present disclosure provide systems and methods that reduce complexity of stowage bin assemblies 120 (as such as uncoupled from oxygen drops and PSUs). Accordingly, embodiments of the present disclosure provide increased options (in terms of size, shape, and the like) for stowage bin assemblies 120. Further, by uncoupling the stowage bin assemblies 120 from the oxygen drops (and optionally, the PSUs), the stowage bin assemblies 120 can be positioned to allow for increased overhead space within an internal cabin.

The stowage bin assembly 120 is separate and uncoupled from a PSU 106 and oxygen drop elements to allow for more flexible bin configurations based on seating and aisle configuration and/or monuments within an internal cabin. As an example, the stowage bin assembly 120 includes a moveable portion 124, such as a sliding bin door that opens and closes in a sliding manner to provide access to the bin contents, which may eliminate the traditional pivoting bin configuration to maximize head and shoulder room when opening the sliding bin door (which may otherwise not be possible with a bulky assembly that includes each of a stowage bin assembly, a PSU, and oxygen drop elements).

Further, the disclosure comprises embodiments according to the following clauses:

Clause 1. A vehicle, comprising:
an internal cabin;
a plurality of stowage bin assemblies within the internal cabin;
a plurality of passenger service units (PSUs) within the internal cabin; and
an emergency oxygen system within the internal cabin, wherein the plurality stowage bin assemblies are uncoupled from one or both of the plurality of PSUs or the emergency oxygen system.

Clause 2. The vehicle of Clause 1, wherein the plurality of stowage bin assemblies are uncoupled from the emergency oxygen system.

Clause 3. The vehicle of Clause 1, wherein the plurality of stowage bin assemblies are uncoupled from the plurality of PSUs.

Clause 4. The vehicle of Clause 1, wherein the plurality of stowage bin assemblies are uncoupled from both the plurality of PSUs and the emergency oxygen system.

Clause 5. The vehicle of any of Clauses 1-4, wherein the internal cabin is devoid of a housing that retains at least a portion of the emergency oxygen system, at least one of the plurality of stowage bin assemblies, and at least one of the plurality of PSUs.

Clause 6. The vehicle of any of Clauses 1-5, wherein each of the plurality of stowage bin assemblies comprises a moveable portion moveably coupled to a fixed structure.

Clause 7. The vehicle of Clause 6, wherein the fixed structure is a strongback.

Clause 8. The vehicle of Clause 7, wherein the moveable portion secures to a first side of the strongback, and wherein at least one of the PSUs secures to a second side, opposite from the first side, of the strongback.

Clause 9. The vehicle of any of Clauses 6-8, wherein the moveable portion is a pivot bin.

Clause 10. The vehicle of any of Clauses 6-9, wherein the moveable portion is a sliding door.

Clause 11. The vehicle of any of Clauses 1-10, wherein at least one area within the internal cabin comprises at least a portion of the emergency oxygen system, but is devoid of the plurality of stowage bin assemblies.

Clause 12. A method for increasing overhead space and configurability with an internal cabin of a vehicle, the method comprising:
uncoupling a plurality of stowage bin assemblies from one or both of a plurality of passenger service units (PSUs) or an emergency oxygen system.

Clause 13. The method of Clause 12, wherein said uncoupling comprises uncoupling the plurality of stowage bin assemblies from the emergency oxygen system.

Clause 14. The method of Clause 12, wherein said uncoupling comprises uncoupling the plurality of stowage bin assemblies from the plurality of PSUs.

Clause 15. The method of Clause 12, wherein said uncoupling comprises uncoupling the plurality of stowage bin assemblies from both the plurality of PSUs and the emergency oxygen system.

Clause 16. A vehicle, comprising:
an internal cabin;
a plurality of stowage bin assemblies within the internal cabin, wherein each of the plurality of stowage bin assemblies include a moveable portion moveably coupled to a fixed structure;
a plurality of passenger service units (PSUs) within the internal cabin; and
an emergency oxygen system within the internal cabin, wherein the plurality stowage bin assemblies are uncoupled from the plurality of PSUs and the emergency oxygen system.

Clause 17. The vehicle of Clause 16, wherein the internal cabin is devoid of a housing that retains at least a portion of the emergency oxygen system, at least one of the plurality of stowage bin assemblies, and at least one of the plurality of PSUs.

Clause 18. The vehicle of Clauses 16 or 17, wherein the fixed structure is a strongback, wherein the moveable portion secures to a first side of the strongback, and wherein at least one of the PSUs secures to a second side, opposite from the first side, of the strongback.

Clause 19. The vehicle of any of Clauses 16-18, wherein the moveable portion is one of a pivot bin or a sliding door.

Clause 20. The vehicle of any of Clauses 16-19, wherein at least one area within the internal cabin comprises at least a portion of the emergency oxygen system, but is devoid of the plurality of stowage bin assemblies.

As described herein, embodiments of the present disclosure provide systems and methods that free up space within a stowage bin assembly. Further, embodiments of the present disclosure provide systems and methods that allow for different sizes and shapes of stowage bin assemblies. Moreover, embodiments of the present disclosure provide systems and methods that allow for increased overhead space within an internal cabin of a vehicle.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A vehicle, comprising:
   an internal cabin;
   a plurality of stowage bin assemblies within the internal cabin, wherein each of the plurality of stowage bin assemblies comprises a moveable portion moveably coupled to a strongback, and wherein the moveable portion secures to a first side of a strongback;
   a plurality of passenger service units (PSUs) within the internal cabin, wherein at least one of the PSUs secures in relation to a second side, opposite from the first side, of the strongback; and
   an emergency oxygen system within the internal cabin, wherein the emergency oxygen system is outboard from the plurality of PSUs and the plurality of stowage bin assemblies, wherein the plurality of PSUs are disposed between the emergency oxygen system and the plurality of stowage bin assemblies.

2. The vehicle of claim 1, wherein the internal cabin is devoid of a housing that retains at least a portion of the emergency oxygen system, at least one of the plurality of stowage bin assemblies, and at least one of the plurality of PSUs.

3. The vehicle of claim 1, wherein the moveable portion is a pivot bin.

4. The vehicle of claim 1, wherein the moveable portion is a sliding door.

5. The vehicle of claim 1, wherein at least one area within the internal cabin comprises at least a portion of the emergency oxygen system, but is devoid of the plurality of stowage bin assemblies.

6. A method for increasing overhead space and configurability within an internal cabin of a vehicle, the method comprising:
   separating a plurality of stowage bin assemblies from a plurality of passenger service units (PSUs) and an emergency oxygen system, wherein each of the plurality of stowage bin assemblies comprises a moveable portion moveably secured to a first side of a strongback, and wherein at least one of the PSUs secures in relation to a second side, opposite from the first side, of the strongback.

7. A vehicle, comprising:
   an internal cabin;
   a plurality of stowage bin assemblies within the internal cabin, wherein each of the plurality of stowage bin assemblies comprises a moveable portion, wherein the moveable portion secures to a first side of a strongback;
   a plurality of passenger service units (PSUs) within the internal cabin, wherein at least one of the PSUs secures in relation to a second side, opposite from the first side, of the strongback; and
   an emergency oxygen system within the internal cabin, wherein the emergency oxygen system is outboard from the plurality of PSUs and the plurality of stowage bin assemblies, wherein the plurality of PSUs are disposed between the emergency oxygen system and the plurality of stowage bin assemblies.

8. The vehicle of claim 7, wherein the internal cabin is devoid of a housing that retains at least a portion of the emergency oxygen system, at least one of the plurality of stowage bin assemblies, and at least one of the plurality of PSUs.

9. The vehicle of claim 7, wherein the moveable portion is one of a pivot bin or a sliding door.

10. The vehicle of claim 7, wherein at least one area within the internal cabin comprises at least a portion of the emergency oxygen system, but is devoid of the plurality of stowage bin assemblies.

11. The vehicle of claim 1, wherein the plurality of stowage bin assemblies are not directly connected to the plurality of PSUs.

12. The vehicle of claim 1, wherein the emergency oxygen system is above seats within the internal cabin.

13. The method of claim 6, wherein the emergency oxygen system is outboard from the plurality of PSUs and the plurality of stowage bin assemblies, and wherein the plurality of PSUs are disposed between the emergency oxygen system and the plurality of stowage bin assemblies.

14. The method of claim 6, wherein the plurality of stowage bin assemblies are not directly connected to the plurality of PSUs.

15. The method of claim 6, wherein the emergency oxygen system is above seats within the internal cabin.

16. The method of claim 6, wherein each of the plurality of stowage bin assemblies comprises a sliding door.

17. The method of claim 6, further comprising:
    moveably securing the moveable portion to the first side of the strongback; and
    securing the at least one of the PSUs in relation to the second side, opposite from the first side, of the strongback.

18. The vehicle of claim 7, wherein the plurality of stowage bin assemblies are not directly connected to the plurality of PSUs.

19. The vehicle of claim 7, wherein the emergency oxygen system is above seats within the internal cabin.

* * * * *